Feb. 6, 1923.
T. B. FUNK.
FURROW GUIDE.
FILED NOV. 25, 1921.
1,444,738.
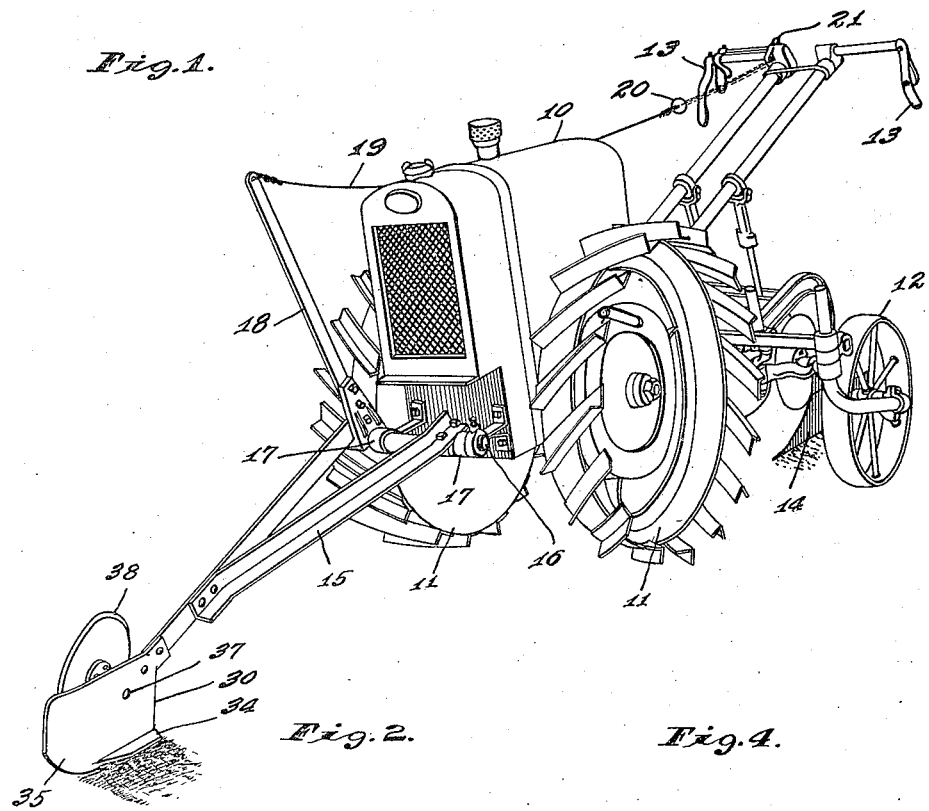
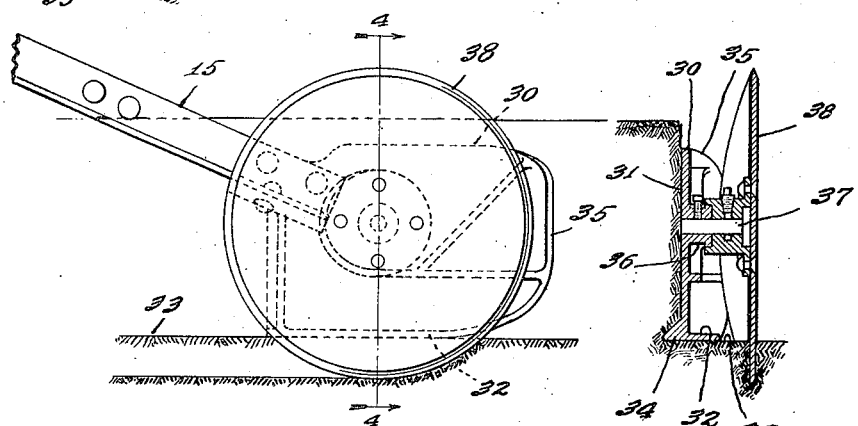
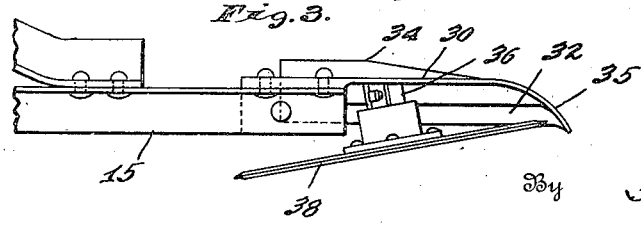
Inventor
TRUMAN B. FUNK,
By Hood & Schley
Attorneys Patented Feb. 6, 1923.

1,444,738

UNITED STATES PATENT OFFICE.

TRUMAN B. FUNK, OF INDIANAPOLIS, INDIANA, ASSIGNOR, BY MESNE ASSIGNMENTS, TO MIDWEST ENGINE CORPORATION, OF INDIANAPOLIS, INDIANA, A CORPORATION OF DELAWARE.

FURROW GUIDE.

Application filed November 25, 1921. Serial No. 517,674.

*To all whom it may concern:*

Be it known that I, TRUMAN B. FUNK, a citizen of the United States, residing at Indianapolis, in the county of Marion and State of Indiana, have invented a new and useful Furrow Guide, of which the following is a specification.

It is the object of my invention to provide a simple and effective furrow guide for maintaining a tractor continually in line with the furrow which it is following, and for mounting such guide so that it may be quickly thrown into or out of operation as desired.

The accompanying drawing illustrates my invention: Fig. 1 is a perspective view of a tractor equipped with a furrow guide in accordance with my invention; Fig. 2 is a side elevation of the front end of the furrow guide; Fig. 3 is a plan of such front end; and Fig. 4 is a vertical section on the line 4—4 of Fig. 2.

The tractor 10 shown is of the type having two forward tractor wheels 11 and rear supporting caster wheels 12, with rearwardly projecting controlling handles 13 for an operator who may walk or ride behind the tractor; and it is shown as operating a plow 14.

The furrow guide has a swinging frame 15, which at its rear end is swingingly mounted on a horizontal shaft 16 supported in suitable bearing brackets 17 carried by the forward end of the tractor 10, so that the furrow guide projects forward from the tractor; and the frame 15 has an upwardly extending arm 18 from which a tension member 19, such as a wire, extends rearwardly to one of the handles 13, so that by pulling such wire the operator may lift the furrow guide out of operation or allow it to drop into operating position. The tension member 19 is conveniently provided with a ring 20 which may be hooked over an upwardly projecting pin 21 on one of the handles 13 to hold the furrow guide elevated.

The frame 15 is in general triangular, and at the forward apex thereof is a vertical plate 30 which bears against the vertical wall 31 formed by the earth on the land side of the furrow. This plate 30 is provided with a foot 32 which rests on the bottom 33 of the furrow, and is preferably provided at the bottom of its earth-engaging vertical face with a laterally projecting toe 34 which cuts into such wall at the bottom to hold the foot 32 down against the bottom 33 of the furrow. The forward end 35 of the plate 30 is curved away from the earth wall 31, as is clear from Fig. 3.

The plate 30 on the opposite side from that which engages the earth wall 31 is provided with a boss 36 in which is set a stub shaft 37 on which is mounted the hub of a disk 38 which is sufficiently large in diameter so that at its lower part it cuts into the bottom 33 of the furrow. The shaft 37 is oblique with respect to the plate 30, so that the disk 38 is closer to such plate toward the front than toward the rear, as is clear from Fig. 3.

In operation, as the tractor 10 moves forward, the foot 32 slides on the bottom 33 of the furrow. The disk 38 rolls as the device moves forward, and at its bottom portion cuts into the bottom 33 of the furrow; and because this disk is oblique, it tends to feed toward the land side of the furrow as it rolls, and thus pushes the plate 30 against the earth wall 31 on such land side. The toe 34 bites into the wall 31 at the bottom, the forward edge of such toe being inclined as shown to assist in this, and the action of this toe together with the weight of the parts holds the foot 32 down upon the bottom 33 of the furrow. The feeding action of the disk 38 toward the land side of the furrow is resisted by the reaction of the wall 31 on the plate 30; and these two opposite forces—the lateral feeding action due to the obliqueness of the disk 38, and the reaction of the earth wall 31 on the plate 30—holds the device in a fixed position in the furrow, and guides the tractor behind so that its wheels 11 and 12 straddle the furrow in definite relation thereto, in which definite relation the tractor is held without requiring attention on the part of the operator.

When the operator desires to throw the furrow guide out of operation, he merely pulls on the tension member 19 and hooks the ring 20 on the pin 21, thus lifting the furrow guide out of the furrow and clear of the ground.

I claim as my invention:

1. A furrow guide for tractors, comprising a forwardly projecting frame mounted on the tractor, a plate on the forward end of said frame for riding in the furrow and bearing against the earth wall on the land side of the furrow, said plate being provided with a toe for cutting into said earth wall, and an obliquely set rotatably mounted disk associated with said plate and arranged to cut into the bottom of the furrow so that as it rolls forward it tends to force said plate toward said earth wall.

2. A furrow guide for tractors, comprising a forwardly projecting frame mounted on the tractor, a plate on the forward end of said frame for riding in the furrow and bearing against the earth wall on the land side of the furrow, said plate being provided with a foot which slides on the bottom of the furrow and with a toe which cuts into said earth wall, and an obliquely set rotatably mounted disk associated with said plate and arranged to cut into the bottom of a furrow so that as it rolls forward it tends to force said plate toward said earth wall.

In witness whereof, I have hereunto set my hand at Indianapolis, Indiana, this 1st day of July, A. D. one thousand nine hundred and twenty one.

TRUMAN B. FUNK.